(12) United States Patent
Inagawa et al.

(10) Patent No.: US 7,232,089 B2
(45) Date of Patent: Jun. 19, 2007

(54) SEAT BELT RETRACTOR

(75) Inventors: Yasuhiro Inagawa, Osaka (JP);
Shizuna Hayashi, Osaka (JP);
Fumihiko Shinoda, Hyogo (JP)

(73) Assignee: Ashimori Industry Co., Ltd.,
Osaka-shi (JP)

(*) Notice: Subject to any disclaimer, the term of this patent is extended or adjusted under 35 U.S.C. 154(b) by 204 days.

(21) Appl. No.: 10/507,363

(22) PCT Filed: Mar. 22, 2002

(86) PCT No.: PCT/JP02/02805

§ 371 (c)(1),
(2), (4) Date: Sep. 20, 2004

(87) PCT Pub. No.: WO03/080404

PCT Pub. Date: Oct. 2, 2003

(65) Prior Publication Data

US 2006/0011764 A1    Jan. 19, 2006

(51) Int. Cl.
*B60R 22/36* (2006.01)
(52) U.S. Cl. .................. 242/379.1; 242/382; 280/805
(58) Field of Classification Search ............ 242/379.1, 242/282; 297/471, 472, 476; 280/805, 807
See application file for complete search history.

(56) References Cited

U.S. PATENT DOCUMENTS

| 4,215,830 | A | * | 8/1980 | Cunningham | 242/372 |
| 4,216,922 | A | * | 8/1980 | Weman | 242/375 |
| 5,558,293 | A | * | 9/1996 | Hirase et al. | 242/372 |
| 5,971,489 | A | * | 10/1999 | Smithson et al. | 297/472 |
| 6,113,022 | A | * | 9/2000 | Ono et al. | 242/379.1 |
| 6,216,972 | B1 | * | 4/2001 | Rohrle | 242/379.1 |
| 6,343,759 | B1 | * | 2/2002 | Specht | 242/375.1 |
| 6,416,008 | B1 | * | 7/2002 | Fujii et al. | 242/379.1 |
| 6,454,199 | B1 | * | 9/2002 | Hori et al. | 242/374 |

FOREIGN PATENT DOCUMENTS

| JP | 10-310027 | 11/1998 |
| JP | 2001-233171 | 8/2001 |
| JP | 2001-287621 | 10/2001 |
| JP | 2002-59810 | 2/2002 |
| WO | 00/71394 | 11/2000 |
| WO | 01/42065 | 6/2001 |

* cited by examiner

*Primary Examiner*—William A. Rivera
*Assistant Examiner*—Scott Haugland
(74) *Attorney, Agent, or Firm*—Oblon, Spivak, McClelland, Maier & Neustadt, P.C.

(57) ABSTRACT

A seat belt retractor includes a take-up drum with webbing wound therearound, a torsion bar coupled to a first end of the take-up drum non-rotatably relative thereto, and a ratchet wheel coupled to a second end of the torsion bar non-rotatably relative thereto. The seat belt retractor further includes a deformable member provided on a second end of the take-up drum for rotating integrally therewith, an internal tooth element (8) provided non-rotatably relative to the torsion bar, and planet gears in mesh with a gear surface of the internal tooth element and in engagement with the deformable member, the planet gears being assembled non-rotatably relative to the torsion bar. The planet gears revolve around the deformable member while biting into the surface of the deformable member to plastically deform the deformable member when the webbing is paid out to cause the sun element and the internal tooth element to rotate relative to each other after an emergency locking member is locked.

16 Claims, 10 Drawing Sheets

F I G . 5
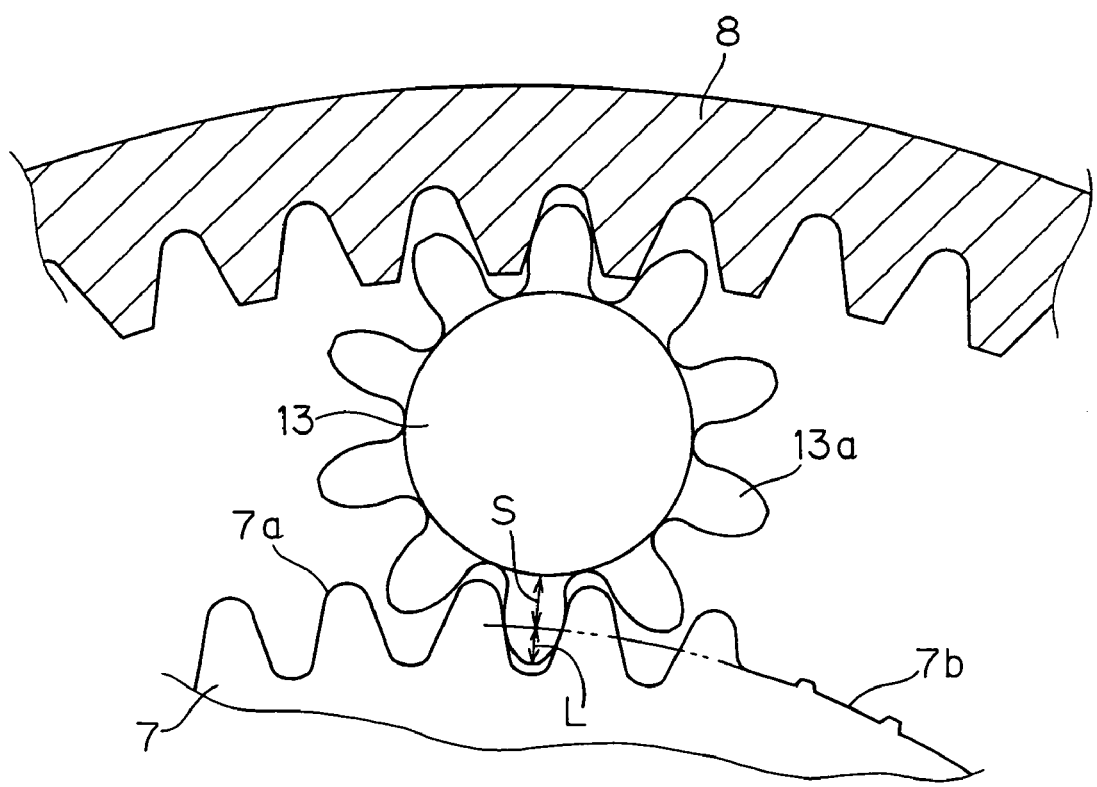

SEAT BELT RETRACTOR

TECHNICAL FIELD

The present invention relates to a seat belt retractor including an energy absorbing mechanism capable of preventing the pay out of webbing in an early stage of a vehicle emergency such as a crash or collision to restrain the forward movement of an occupant, thereby efficiently absorbing energy acting upon the occupant.

BACKGROUND ART

In general, a seat belt system provided for a seat of a vehicle and the like is constructed so that webbing is wound into a retractor having an emergency locking device. In the event of a crash or the like, the emergency locking device operates to stop the rotation of a take-up drum around which the webbing is wound. This prevents the pay out of the webbing to restrain and protect an occupant.

There has also been proposed a seat belt retractor including an energy absorbing mechanism which, if a load acting on the webbing exceeds a preset predetermined value, causes a predetermined amount of pay out of the webbing under a predetermined load by the use of the twisting deformation of a torsion bar, thereby to absorb an impact energy occurring on the occupant.

A seat belt retractor of this type is disclosed in, for example, Japanese Patent Application Laid-Open No. 10-310027 (1998), which comprises a substantially tubular take-up drum on which webbing is wound, an emergency locking means for coupling a locking base to a retractor base to stop rotation in a direction in which the webbing is paid out in the event of a vehicle emergency, and an energy absorbing means for allowing the pay out of the webbing after the operation of the emergency locking means while applying a predetermined load to the webbing.

If a tension equal to or greater than the predetermined load acts on the webbing in the event of a vehicle emergency, the pay out of the webbing causes the take-up drum to move in the direction in which the webbing is paid out into contact with an inner peripheral portion of the retractor base. As the take-up drum is rotated by the pay out of the webbing resulting from the subsequent twisting deformation of the torsion bar, a grinding means provided on the inner peripheral portion of the retractor base cuts an outer peripheral surface of the take-up drum to absorb the energy. Additionally, the twisting deformation of the torsion bar also absorbs the energy.

However, the seat belt retractor disclosed in the above-mentioned background art document is structured so that the cutting by the grinding means is done after a free end portion of the take-up drum supported at one end in cantilevered fashion by the retractor base is moved to the aforementioned inner peripheral portion in the event of a vehicle emergency. Such a structure causes the start of the energy absorption by the grinding to be delayed by a time interval required for the movement until the take-up drum comes into contact with the inner peripheral portion, thereby decreasing the energy absorption immediately after the start of the pay out of the webbing. This increases the amount of forward movement of an occupant to create a danger that a secondary crash or collision against a steering or an instrument panel occurs and a danger that the impact force of the occupant upon an inflated air bag increases.

Further, because of the cantilevered structure, the take-up drum has a support structure such that the center of rotation thereof on the free end is movable. Hence, the take-up drum might be removed from the aforementioned inner peripheral portion by the force of contact with the inner peripheral portion of the retractor base or be engaged deeply into the grinding means. Moreover, under normal conditions, there is a danger that the take-up drum inadvertently moves to roughen a surface to be ground. In such cases, a problem arises that the grinding by the grinding means is not performed uniformly whereby stable energy absorption is not achieved.

DISCLOSURE OF INVENTION

It is an object of the present invention to provide a seat belt retractor capable of absorbing energy efficiently and stably immediately after webbing is paid out.

According to one aspect of the present invention, a seat belt retractor including a take-up drum with webbing wound therearound, the take-up drum being rotatably urged in a direction in which the webbing is wound up, a torsion bar fitted by insertion in the take-up drum and having a first end coupled to a first end of the take-up drum non-rotatably relative thereto, a ratchet wheel coupled to a second end of the torsion bar non-rotatably relative thereto, an emergency locking member operative, in the event of a vehicle emergency, to be locked to the ratchet wheel to stop the rotation of the ratchet wheel, thereby stopping the rotation of the take-up drum in a direction in which the webbing is paid out, the torsion bar being twistingly deformed when the webbing is further paid out after the emergency locking member is locked, comprises: a cylindrical sun element provided on a second end of said take-up drum and rotating integrally with the take-up drum; an internal tooth element provided near the second end of said torsion bar non-rotatably relative to the torsion bar and having an inner peripheral surface opposed to and spaced apart from an outer peripheral surface of said sun element, one of the outer peripheral surface of the sun element and the inner peripheral surface of the internal tooth element being a gear surface, the other being formed by a deformable member; and at least one planet gear established non-rotatably relative to said torsion bar, said planet gear being assembled in mesh with said gear surface and in engagement with said deformable member opposed to said gear surface, wherein the planet gear revolves around the deformable member while biting into the surface of the deformable member to plastically deform the deformable member when the webbing is paid out to cause the sun element and the internal tooth element to rotate relative to each other after said emergency locking member is locked.

According to this aspect, if a tension equal to or greater than a predetermined load acts on the webbing, the twisting deformation of the torsion bar and the plastic deformation of the deformable member in the assembled condition can be started at the same time. The webbing is paid out under a heavier load immediately after the start of the pay out of the webbing. Therefore, the application of the high load immediately after the pay out of the webbing achieves efficient energy absorption to restrict the pay out of the webbing, thereby reducing the forward movement of an occupant. This is advantageous in preventing the occupant from crashing against a steering or an instrument panel, and in effectively reducing the impact force of the occupant upon an air bag.

Further, there is no movement of the axis of the take-up drum, and the meshing engagement between the planet gear, and the internal tooth element and the sun element is not released in the course of the plastic deformation. This is advantageous in stably applying the load until the plastic deformation of the deformable member is completed.

Moreover, the load applied to the webbing is controllable by changing the gear ratio of the planet gear and the like, and the material of the deformable member and the like. This is also advantageous in that the setting of the amount of energy absorption can be easily changed depending on the type of a vehicle, and the like.

In another aspect of the seat belt retractor according to the present invention, the depth of bite of said planet gear into said deformable member is less than the length of a gap between the surface of the deformable member and the root of teeth of the planet gear.

This aspect is advantageous in that the gap between the planet gear and the surface of the deformable member effectively provides refuge to displaced wall portions formed during the plastic deformation, to achieve the stable plastic deformation occurring when the planet gear gradually bites into the surface of the deformable member.

In still another aspect of the seat belt retractor according to the present invention, the deformable member is formed so that the area of said plastic deformation gradually decreases in a direction of movement of the planet gear from a position in which the planet gear is assembled to said deformation member.

This aspect offers an advantage in smoothly decreasing the energy acting on the occupant because the load on the webbing is the highest in the early stage of the start of the pay out of the webbing and the load on the webbing decreases gradually as the webbing is paid out.

In a further aspect of the seat belt retractor according to the present invention, said deformation member is provided with a projecting positioning pin, and said one of said sun element and said internal tooth element having said gear surface is provided with an engagement hole, the engagement hole being engaged by said positioning pin when in an assembled position.

According to this aspect, the assembly process is facilitated, and the sun element, the planet gear and the internal tooth element can be handled as a unit. Additionally, the loads of the positioning pins sheared at the start of the plastic deformation of the deformable member are added for initial energy absorption. This is advantageous in effectively contributing to the application of the high load in the early stage of the pay out of the webbing.

In a still further aspect of the seat belt retractor according to the present invention, each of the teeth of the planet gear is formed in a trapezoidal configuration with a gradually decreasing width from the root of each tooth toward the top thereof.

This aspect offers advantages in providing smoother plastic deformation by the biting into the surface of the deformable member and in providing smoother refuge to the wall portions displaced by the plastic deformation.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is an explanatory view on an enlarged scale of principal portions;

BEST MODE FOR CARRYING OUT THE INVENTION

Figure 1:
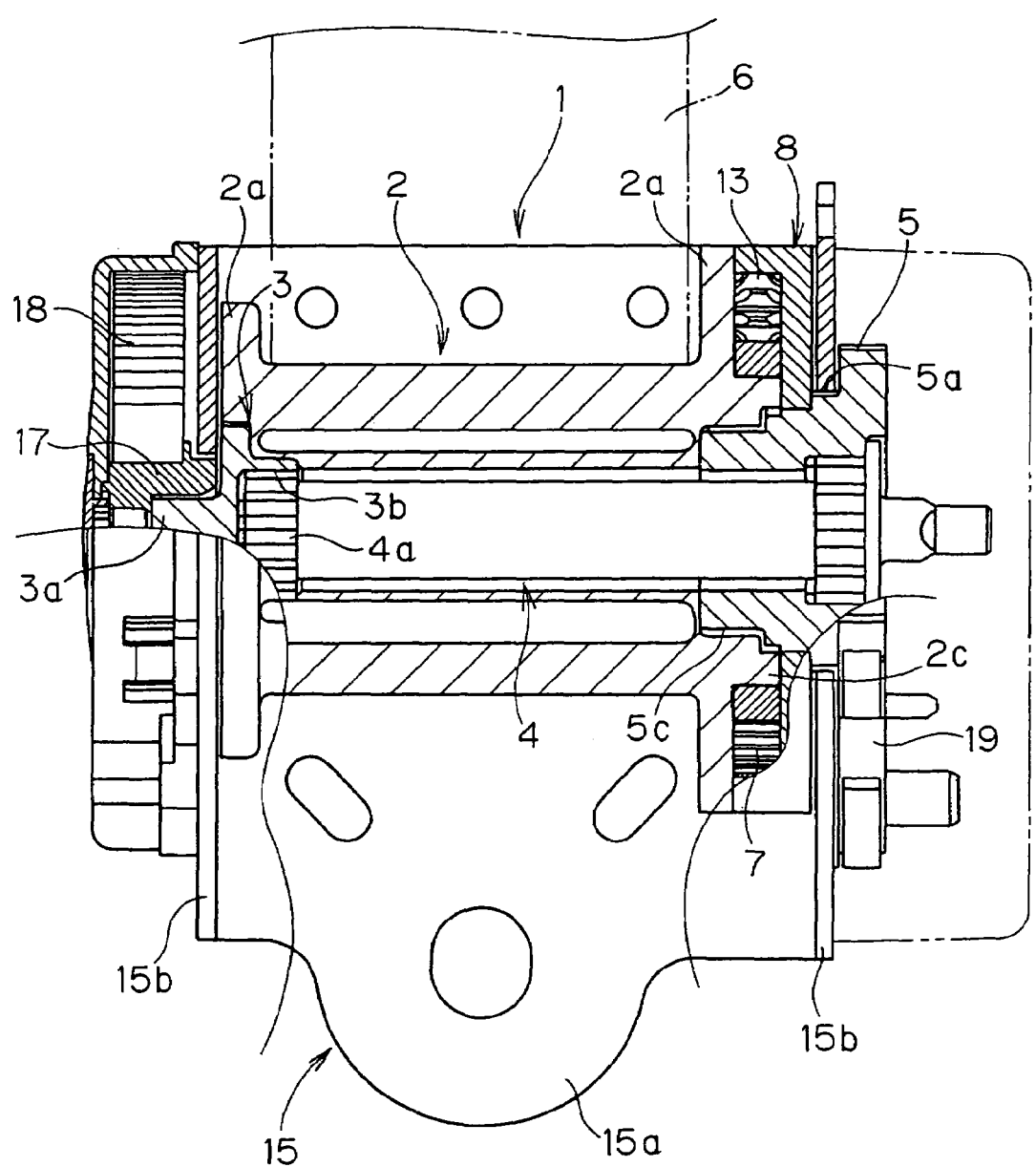
FIG. 1 is a front view showing a first preferred embodiment according to the present invention.
Figure 2:
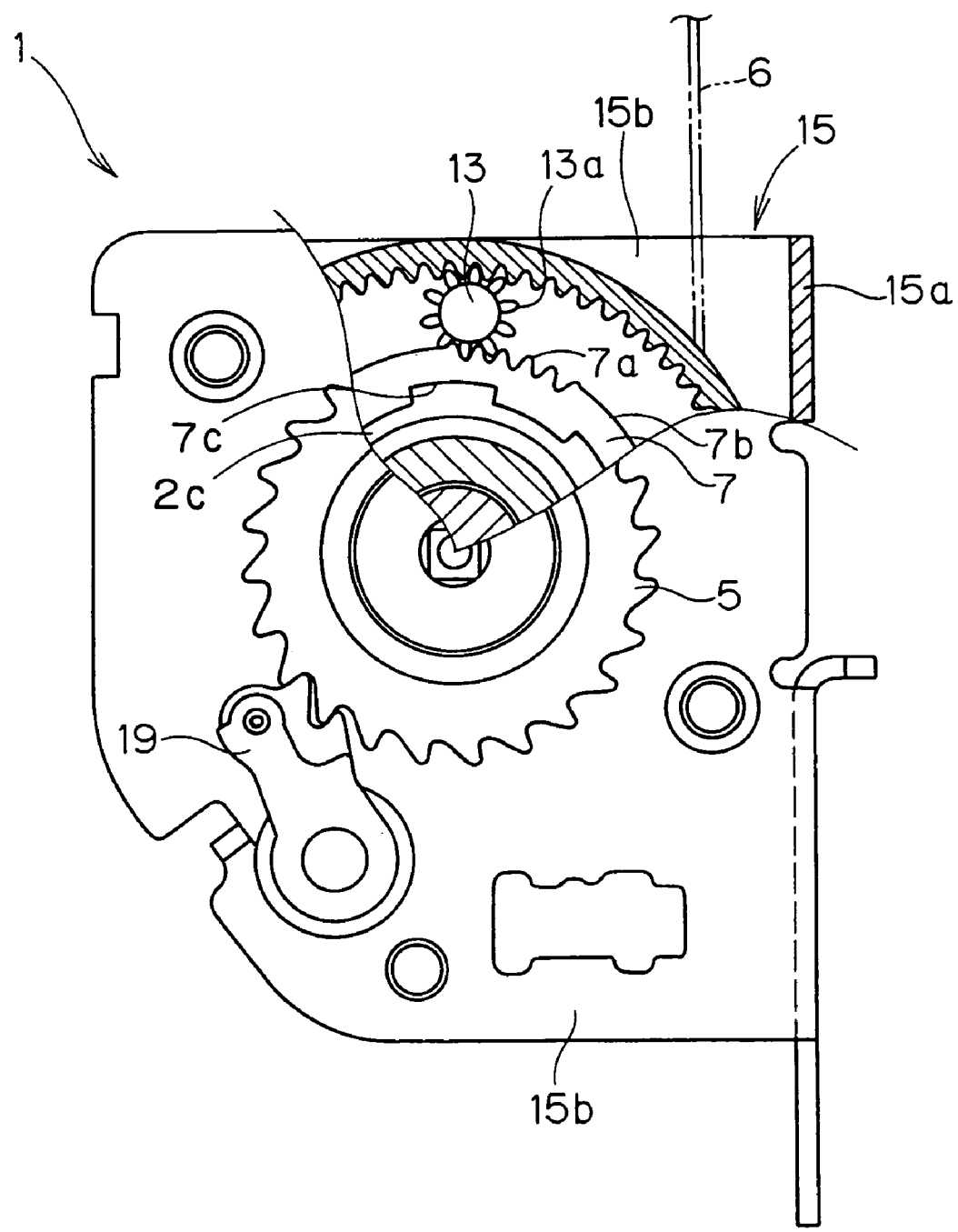
FIG. 2 is a side view of the first preferred embodiment.
Figure 3:
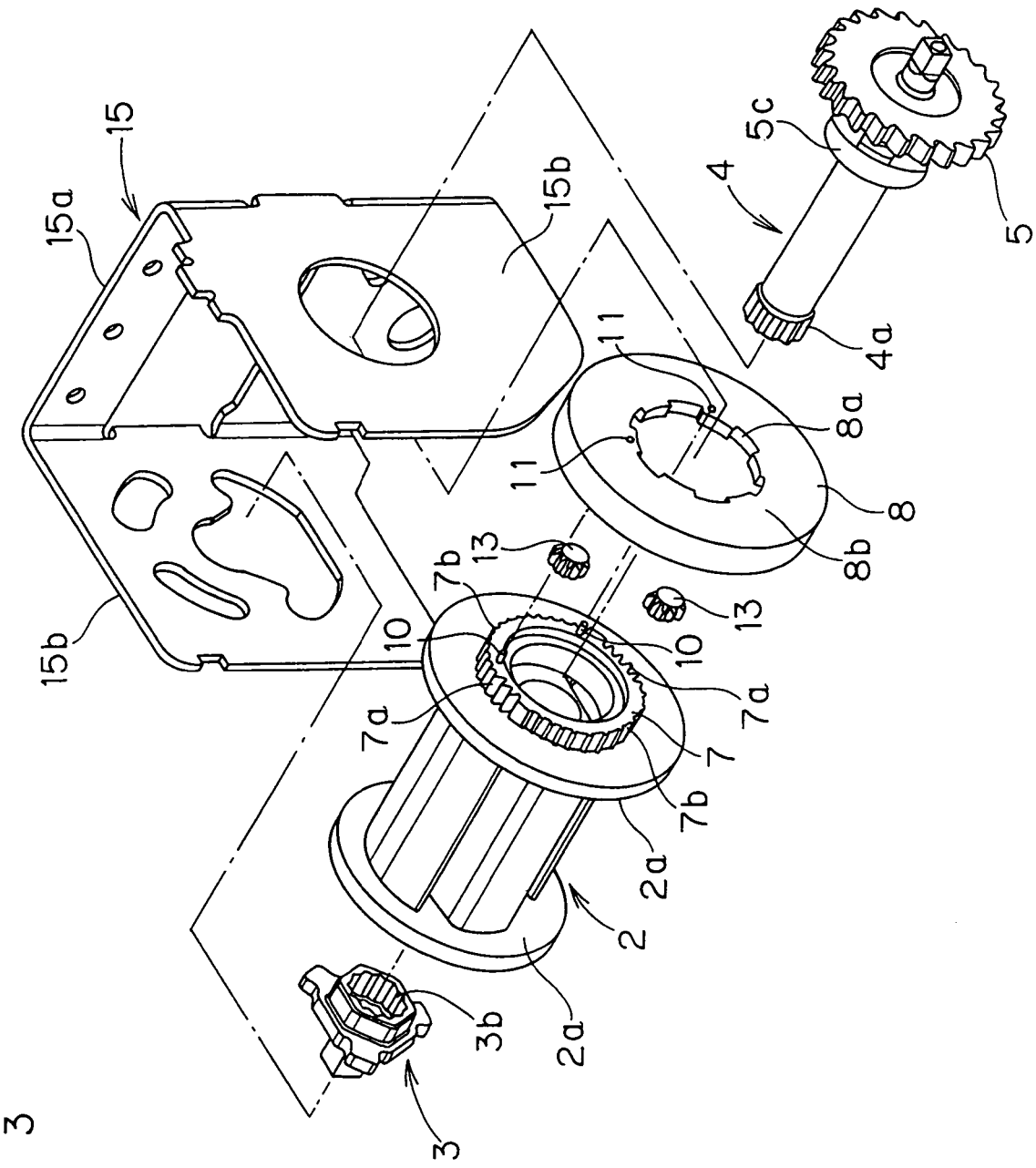
FIG. 3 is an exploded perspective view of the first preferred embodiment.
Figure 4:
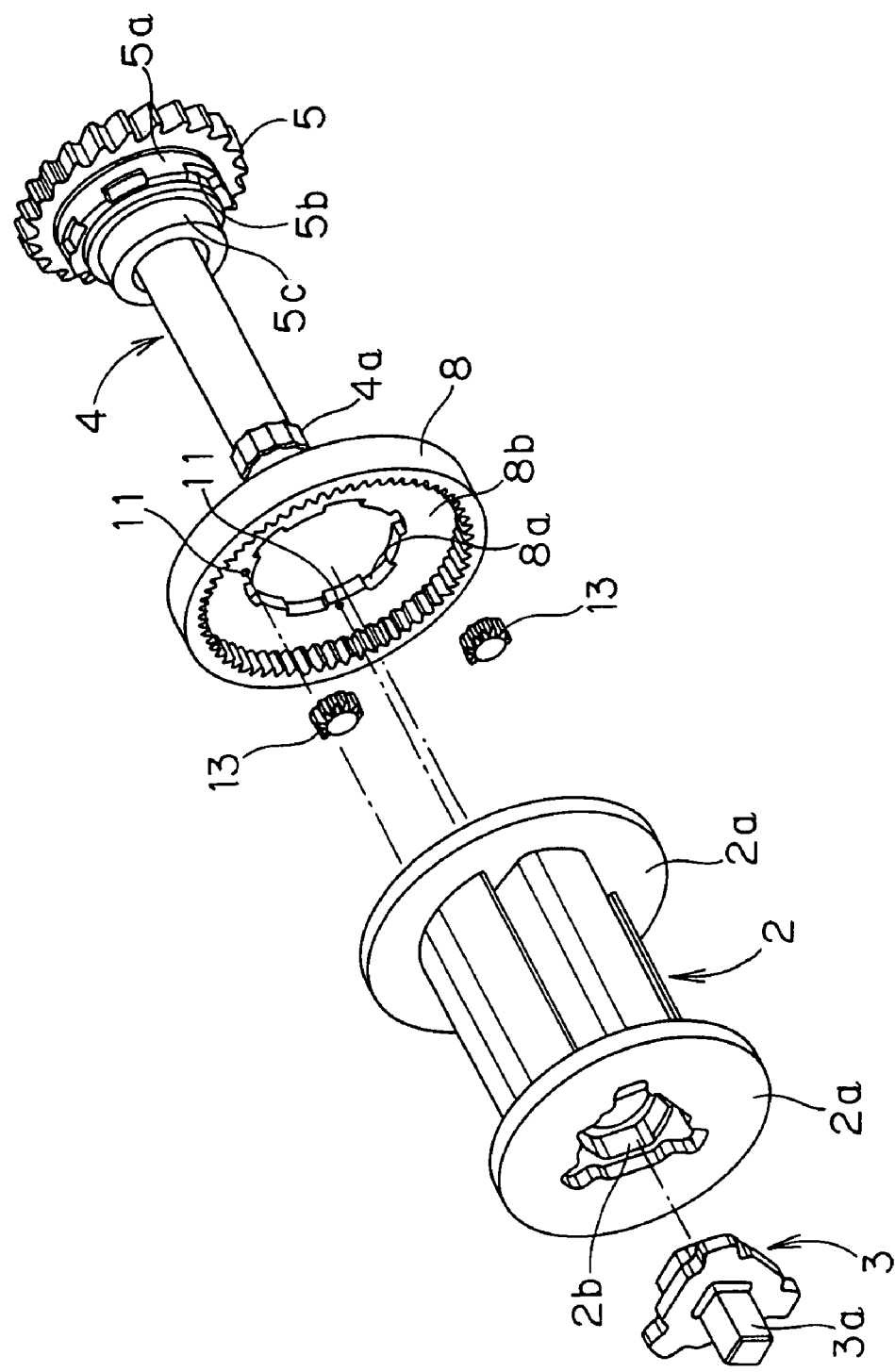
FIG. 4 is an exploded perspective view of the first preferred embodiment.

A first preferred embodiment according to the present invention will now be described with reference to the drawings. As shown in FIGS. 1 to 5, a seat belt retractor 1 comprises a take-up drum 2 made of an aluminum material on which webbing 6 is to be wound. The take-up drum 2 has flange portions 2a provided on opposite axial ends and formed to overhang radially. A coupling element 3 made of a steel material and having a shaft portion 3a in the form of a prism on one side and a splined recess portion 3b on the other side is pressed and fixed in a coupling hole portion 2b non-rotatably relative thereto, the coupling hole portion 2b being formed in one of the flange portions 2a.

A torsion bar 4 is fitted by insertion in the take-up drum 2. A splined portion 4a provided on one end of the torsion bar 4 is spline-coupled to the aforementioned splined recess portion 3b. The torsion bar 4 and the take-up drum 2 are coupled non-rotatably relative to each other together on respective one ends. A ratchet wheel 5 made of a steel material is pressed and fixed in the other end of the torsion bar 4. The ratchet wheel 5 and the other end of the torsion bar 4 are coupled together non-rotatably relative to each other.

A tubular splined shaft portion 2c is formed concentrically and integrally with the outer surface of the flange portion 2a on the other end of the take-up drum 2. A splined hole portion 7c formed in a deformable member 7 made of an aluminum material and serving as a cylindrical sun element or central element is spline-coupled to the aforementioned splined shaft portion 2c. An internal gear 8 is disposed which serves as an internal tooth element having an inner peripheral surface opposed to and spaced apart from the outer peripheral surface of the deformable member 7. The internal gear 8 is made of a steel material, and comprises a support side wall 8b including a splined hole portion 8a on one side thereof. The splined hole portion 8a of the support side wall 8b is spline-coupled to a splined portion 5b formed in a shaft portion 5a of the aforementioned ratchet wheel 5. The torsion bar 4 and the internal gear 8 are coupled together non-rotatably relative to each other.

A pair of circumferentially spaced projecting positioning pins 10 are formed integrally with an opposed surface of the deformable member 7 to the support side wall 8b. Engagement holes 11 are formed in corresponding positions of the support side wall 8b so that the respective positioning pins 10 detachably engage the engagement holes 11 when in an assembled position.

A pair of planet gears 13 made of a steel material are assembled between the outer peripheral surface of the deformable member 7 and the gear surface or the inner peripheral surface of the internal gear 8. The planet gears 13 mesh with the gear surface of the internal gear 8, and are in meshing engagement with two toothed portions 7a, respectively, formed in diametrically spaced positions of the outer peripheral surface of the deformable member 7. Non-toothed portions 7b on the outer peripheral surface of the deformable member 7 which are on opposite sides of each of the toothed portions 7a, and teeth 13a of the planet gears 13 are structured so as not to mesh with each other. When the planet gears 13 are assembled, the planet gears 13 are constructed non-rotatably relative to the torsion bar 4.

The take-up drum 2 to which the planet gears 13 are assembled, the torsion bar 4, and the like are rotatably supported by a housing element 15 of a generally U-shaped plan configuration which comprises a back plate 15a for fixing to a vehicle body, and a pair of side plates 15b extending from opposite side edges of the back plate 15a and opposed to each other.

As shown in FIG. 1, on the one end of the take-up drum 2, the shaft portion 3a of the coupling element 3 is fitted in a take-up shaft 17 non-rotatably relative thereto, the take-up shaft 17 being supported rotatably by one of the side plates 15b. On the other end of the take-up drum 2, the shaft portion 5a of the ratchet wheel 5 is rotatably supported by the other side plate 15b. At this time, the other end of the take-up drum 2 is also journaled on a support shaft portion 5c of the ratchet wheel 5.

A spiral spring 18 is mounted on the take-up shaft 17 supported by the one side plate 15b to normally rotatably urge the take-up shaft 17 in a direction in which the webbing 6 is wound up. The other side plate 15b is provided with an emergency locking device (not shown) including a pawl 19 serving as an emergency locking member which, in the event of a vehicle emergency such as a crash or collision, is detachably locked to the ratchet wheel 5 positioned on the outer surface of the side plate 15b to stop the rotation of the ratchet wheel 5.

The emergency locking device which is actuated upon detection of an acceleration applied to the vehicle body and an abnormal inclination in the event of the crash and the like may appropriately employ conventionally known structures disclosed in Japanese Utility Model Application Laid-Open No. 5-78658 (1993), Japanese Utility Model Application Laid-Open No. 6-27384 (1994), Japanese Patent Application Laid-Open No. 10-138869 (1998), and the like.

When the emergency locking device is actuated in the event of a vehicle emergency such as a crash or collision to lock the pawl 19 to the ratchet wheel 5, the rotation of the ratchet wheel 5 is stopped. This stops the rotation of the take-up drum 2 to stop the rotation in a direction in which the webbing 6 wound on the take-up drum 2 is paid out.

If a tension equal to or greater than a predetermined load acts on the webbing 6 after the actuation of this emergency locking device, the one end of the torsion bar 4 rotates integrally with the take-up drum 2 coupled non-rotatably relative thereto, whereas the other end of the torsion bar 4 is prevented by the emergency locking device from rotating in the direction in which the webbing 6 is paid out. Therefore, a twisting deformation appears in the torsion bar 4 as the take-up drum 2 rotates. Thus, the webbing 6 is paid out while the torsion bar 4 is twistingly deformed to absorb loads.

On the other hand, at the same time that this take-up drum 2 starts to rotate, that is, the twisting deformation appears in the torsion bar 4, the positioning pins 10 are sheared whereby the deformable member 7 formed on the other end of the take-up drum 2 rotates integrally with the take-up drum 2, and rotates relative to the internal gear 8 made non-rotatable by the emergency locking device.

The rotation of the deformable member 7 and the internal gear 8 relative to each other causes each of the planet gears 13 in mesh with the gear surface of the internal gear 8 to roll from the toothed portion 7a of the deformable member 7 in engagement therewith to a position of the non-toothed portion 7b on the outer peripheral surface. The planet gears 13 gradually bite into the deformable member 7 to plastically deform the deformable member 7.

In this process, as shown in FIG. 5, the depth of bite L of the planet gear 13 into the deformable member 7 is less than the length 5 of a gap between the surface of the non-toothed portion 7b of the deformable member 7 and the root of the teeth 13a of the planet gear 13. Therefore, when the planet gear 13 gradually bites into the non-toothed portion 7b of the deformable member 7, the gap can sufficiently accommodate a displaced wall portion formed during the plastic deformation to allow the smooth plastic deformation of the deformable member 7 by biting.

Further, the deformable member 7 is formed integrally with the take-up drum 2, and the opposite ends of the take-up drum 2 are normally supported by the respective side plates 15b through the shaft portion 3a and the ratchet wheel 5. This prevents the center of rotation of the take-up drum 2, i.e., the deformable member 7 from being misaligned during the pay out of the webbing 6 to allow the energy absorption by the plastic deformation of the deformable member 7 to start in an early stage of the pay out of the webbing 6.

Figure 6:
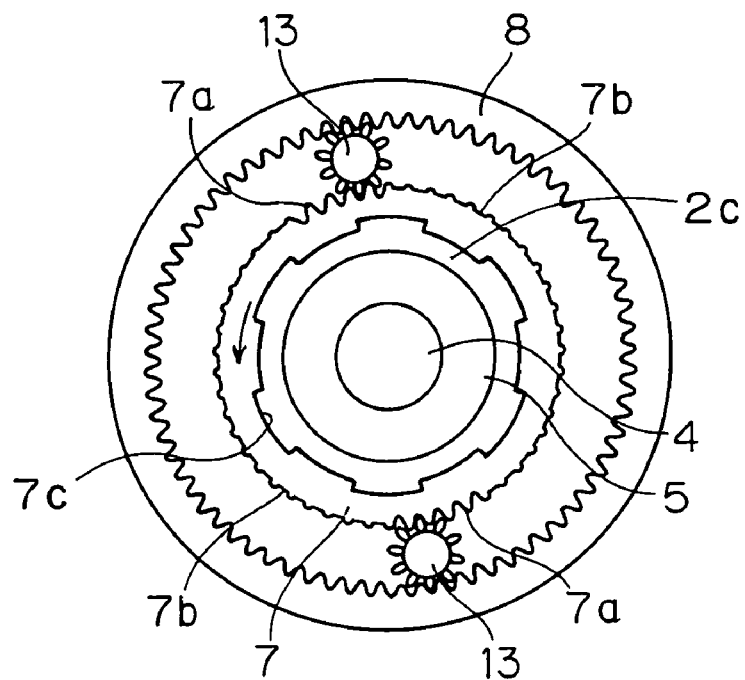
FIG. 6 is a view for illustrating operations.
Figure 7:
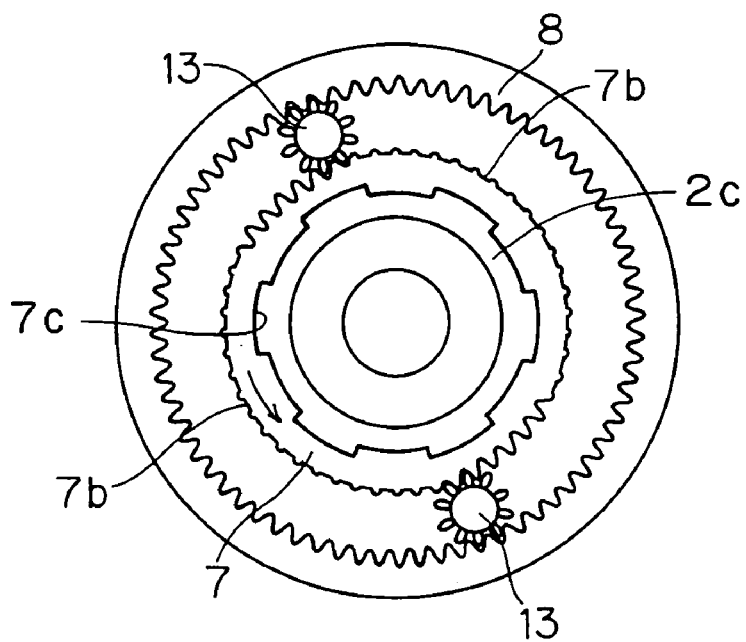
FIG. 7 is a view for illustrating operations.
Figure 8:
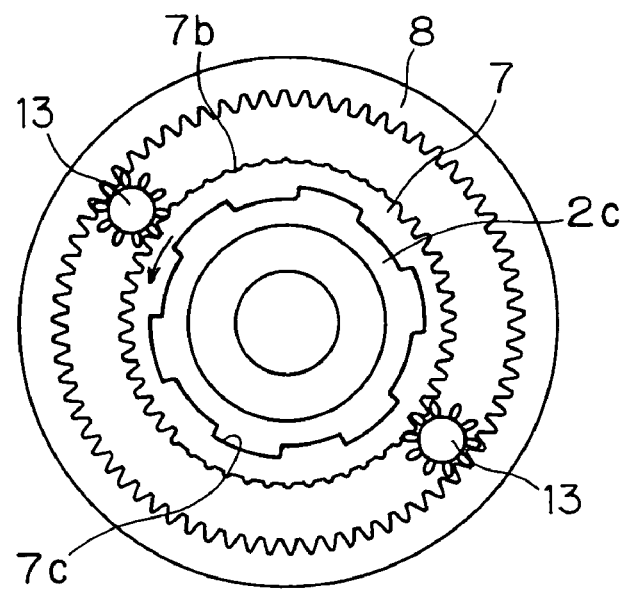
FIG. 8 is a view for illustrating operations.
Figure 9:
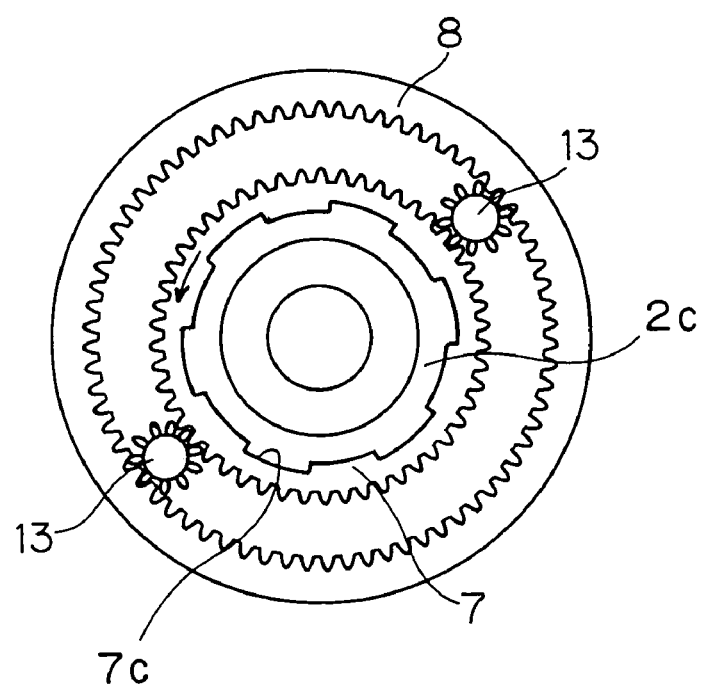
FIG. 9 is a view for illustrating operations.

When the webbing 6 is paid out from the initial position shown in FIG. 6, the deformable member 7 and the internal gear 8 rotate relative to each other as the take-up drum 2 rotates. Then, as shown in FIGS. 7 and 8, each of the planet gears 13 rolls around the outer periphery of the deformable member 7 while being in mesh with the gear surface of the internal gear 8, and gradually bites into the non-toothed portion 7b of the deformable member 7 to plastically deform the deformable member 7. Because the torsion bar 4 is twistingly deformed at the same time, only the torsion bar 4 becomes twistingly deformed after each of the planet gears 13 finishes cutting teeth on the deformable member 7 by the plastic deformation, as shown in FIG. 9.

As described above, if a tension equal to or greater than the predetermined load acts on the webbing 6, the twisting deformation of the torsion bar 4 and the plastic deformation of the deformable member 7 in the assembled condition can be started at the same time, and the webbing 6 is paid out under a heavier load immediately after the start of the pay out of the webbing 6. Therefore, the application of the high load immediately after the pay out of the webbing 6 achieves efficient energy absorption to restrict the pay out of the webbing 6, thereby reducing the forward movement of an occupant. This effectively reduces the impact force of the occupant upon an air bag.

Further, there is no movement of the axis of the take-up drum 2, and the meshing engagement between the planet gears 13, and the internal gear 8 and the deformable member 7 is not released in the course of the plastic deformation. Thus, the stable application of the load is continued until the plastic deformation of the deformable member 7 is completed.

Moreover, the load applied to the webbing 6 is controllable by changing the gear ratio of the planet gears 13 and the like, and the material of the deformable member 7 and the like. Thus, the setting of the amount of energy absorption can be easily changed depending on the type of a vehicle, and the like.

The gap between the planet gears 13 and the non-toothed portions 7b effectively provides refuge to the displaced wall portions formed during the plastic deformation, to achieve the stable plastic deformation occurring when the planet gears 13 gradually bite into the non-toothed portions 7b on the surface of the deformable member 7.

Figure 10:
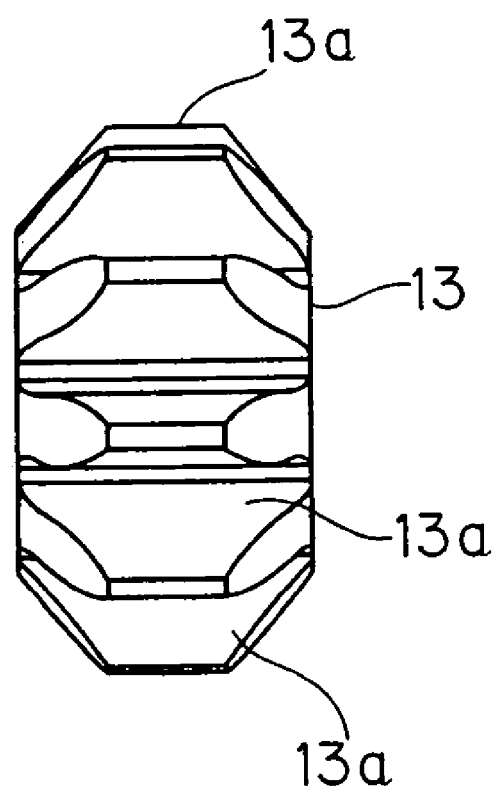
FIG. 10 is a front view of a planet gear.

Furthermore, as shown in FIG. 10, each of the teeth 13a of the planet gears 13 is formed in a trapezoidal configuration with a gradually decreasing width from the root of each tooth 13a toward the top thereof. As compared with so-called rectangular teeth with a constant width toward the top, the teeth 13a have advantages in smoother plastic deformation by the biting into the non-toothed portions 7b of the deformable member 7 and in smoother refuge of the wall portions displaced by the plastic deformation.

Assembly by engagement of the engagement holes 11 of the internal gear 8 with the positioning pins 10 of the deformable member 7 provides easy alignment, and allows the deformable member 7, the planet gears 13 and the internal gear 8 to be handled as a unit. This facilitates the assembly process.

The loads of the positioning pins 10 sheared at the start of the plastic deformation of the deformable member 7 are added for the initial energy absorption, to effectively contribute to the application of the high load in the early stage of the pay out of the webbing 6.

Figure 11:
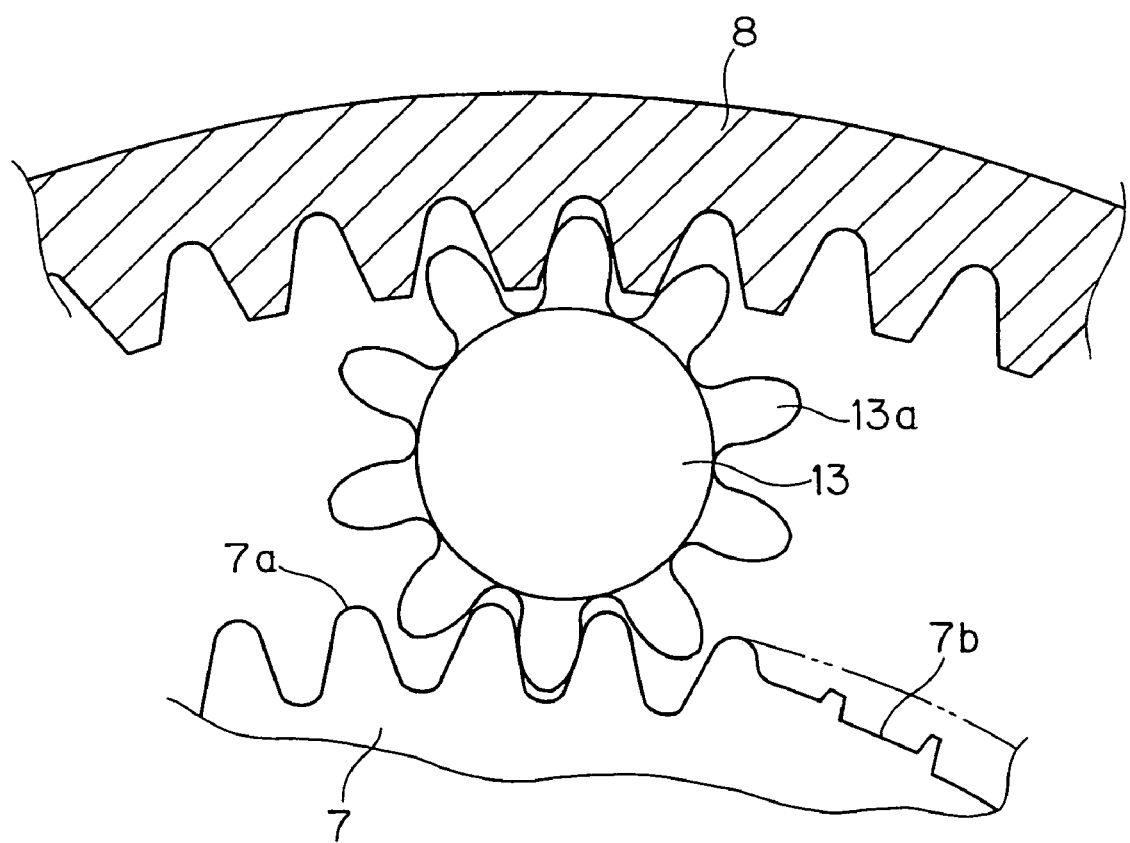
FIG. 11 is an explanatory view on an enlarged scale of principal portions showing a second preferred embodiment.

FIG. 11 shows a second preferred embodiment in which the non-toothed portion 7b of the deformable member 7 is structured to gradually increase in depth in a direction of the relative movement of the planet gear 13 from the assembled position of the planet gear 13.

This not only produces effects similar to those of the first preferred embodiment, but also offers an advantage in being capable of smoothly decreasing the energy acting on an occupant because the load on the webbing 6 is the highest in the early stage of the start of the pay out of the webbing 6 and the load on the webbing 6 decreases gradually as the webbing 6 is paid out.

Although the non-toothed portion 7b is shown as structured to gradually increase in depth in the direction of the relative movement of the planet gear 13 from the assembled position of the planet gear 13, similar effects are produced by a structure such that the radial length of the non-toothed portion 7b of the deformable member 7 gradually decreases in the direction of the relative movement of the planet gear 13 from the assembled position of the planet gear 13. Therefore, similar effects are produced by forming the deformable member 7 so that the area of the plastic deformation of the non-toothed portion 7b gradually decreases in the direction of the movement of the planet gear 13 from the assembled position of the planet gear 13.

Figure 12:
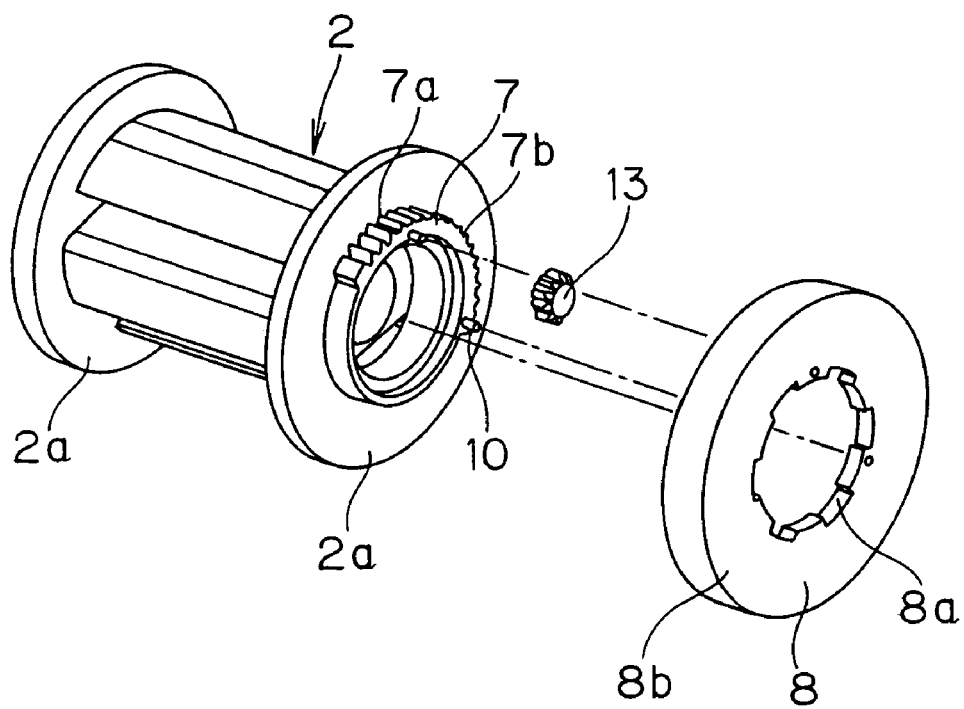
FIG. 12 is an explanatory view on an enlarged scale of principal portions showing a third preferred embodiment.

FIG. 12 shows a third preferred embodiment which exhibits a structure including a single planet gear 13. This also produces effects similar to those of the first preferred embodiment.

Thus, the number of planet gears 13 is not limited to one or two, but may be appropriately determined in accordance with the amount of initial energy absorption.

Further, the deformable member 7 may be formed integrally with the take-up drum 2.

Although the structure in each of the above-mentioned preferred embodiments uses the deformable member 7 as the sun element, another structure may be employed in which a sun gear in mesh with the planet gear(s) 13 serves as the sun element and the deformable member serves as the internal tooth element.

While the invention has been shown and described in detail, the foregoing description is in all aspects illustrative and not restrictive. It is therefore understood that numerous modifications and variations can be devised without departing from the scope of the invention.

The invention claimed is:

1. A seat belt retractor including a take-up drum with webbing wound therearound, the take-up drum being rotatably urged in a direction in which the webbing is wound up, a torsion bar fitted by insertion in the take-up drum and having a first end coupled to a first end of the take-up drum non-rotatably relative thereto, a ratchet wheel coupled to a second end of the torsion bar non-rotatably relative thereto, an emergency locking member operative, in the event of a vehicle emergency, to be locked to the ratchet wheel to stop the rotation of the ratchet wheel, thereby stopping the rotation of the take-up drum in a direction in which the webbing is paid out, the torsion bar being twistingly deformed when the webbing is further paid out after the emergency locking member is locked, said seat belt retractor comprising:

a cylindrical sun element provided on a second end of said take-up drum and rotating integrally with the take-up drum; an internal tooth element provided near the second end of said torsion bar non-rotatably relative to the torsion bar and having an inner peripheral surface opposed to and spaced apart from an outer peripheral surface of said sun element, one of the outer peripheral surface of the sun element and the inner peripheral surface of the internal tooth element being a gear surface, the other being formed by a deformable member; and at least one planet gear, said planet gear being assembled in mesh with said gear surface and in engagement with said deformable member opposed to said gear surface, wherein the planet gear revolves around the deformable member while biting into the surface of the deformable member to plastically deform the deformable member when the webbing is paid out to cause the sun element and the internal tooth element to rotate relative to each other after said emergency locking member is locked.

2. The seat belt retractor according to claim 1, wherein the depth of bite of said planet gear into said deformable member is less than the length of a gap between the surface of the deformable member and the root of teeth of the planet gear.

3. The seat belt retractor according to claim 2, wherein the deformable member is formed so that a depth of bite decreases in a direction of movement of the planet gear from a position in which the planet gear is assembled to said deformable member.

4. The seat belt retractor according to claim 3, wherein said deformation member is provided with a projecting positioning pin, and said one of said sun element and said internal tooth element having said gear surface is provided with an engagement hole, the engagement hole being engaged by said positioning pin when in an assembled position.

5. The seat belt retractor according to claim 4, wherein each of the teeth of the planet gear is formed in a trapezoidal configuration with a gradually decreasing width from the root of each tooth toward the top thereof.

6. The seat belt retractor according to claim 3, wherein each of the teeth of the planet gear is formed in a trapezoidal configuration with a gradually decreasing width from the root of each tooth toward the top thereof.

7. The seat belt retractor according to claim 2, wherein said deformable member is provided with a projecting positioning pin, and said one of said sun element and said internal tooth element having said gear surface is provided with an engagement hole, the engagement hole being engaged by said positioning pin when in an assembled position.

8. The seat belt retractor according to claim 7, wherein each of the teeth of the planet gear is formed in a trapezoidal configuration with a gradually decreasing width from the root of each tooth toward the top thereof.

9. The seat belt retractor according to claim 2, wherein each of the teeth of the planet gear is formed in a trapezoidal configuration with a gradually decreasing width from the root of each tooth toward the top thereof.

10. The seat belt retractor according to claim 1, wherein the deformable member is formed so that a depth of bite decreases in a direction of movement of the planet gear from a position in which the planet gear is assembled to said deformable member.

11. The seat belt retractor according to claim 10, wherein said deformation member is provided with a projecting positioning pin, and said one of said sun element and said internal tooth element having said gear surface is provided with an engagement hole, the engagement hole being engaged by said positioning pin when in an assembled position.

12. The seat belt retractor according to claim 11, wherein each tooth of the planet gear is formed in a trapezoidal configuration with a gradually decreasing width from the root of each tooth toward the top thereof.

13. The seat belt retractor according to claim 10, wherein each tooth of the planet gear is formed in a trapezoidal configuration with a gradually decreasing width from the root of each tooth toward the top thereof.

14. The seat belt retractor according to claim 1, wherein said deformable member is provided with a projecting positioning pin, and said one of said sun element and said internal tooth element having said gear surface is provided with an engagement hole, the engagement hole being engaged by said positioning pin when in an assembled position.

15. The seat belt retractor according to claim 14, wherein each tooth of the planet gear is formed in a trapezoidal configuration with a gradually decreasing width from the root of each tooth toward the top thereof.

16. The seat belt retractor according to claim 1, wherein each tooth of the planet gear is formed in a trapezoidal configuration with a gradually decreasing width from the root of each tooth toward the top thereof.

* * * * *